United States Patent
Pareek et al.

(10) Patent No.: US 8,296,269 B2
(45) Date of Patent: Oct. 23, 2012

(54) APPARATUS AND METHOD FOR READ CONSISTENCY IN A LOG MINING SYSTEM

(75) Inventors: Alok Pareek, Brisbane, CA (US); Scott Roger Corbin, Spooner, WI (US); Jennifer Wei, Fountain Valley, CA (US); Lego Haryanto, Folsom, CA (US); Eric Ian Fish, Kentfield, CA (US)

(73) Assignee: Oracle International Corporation, Redwood Shores, CA (US)

( * ) Notice: Subject to any disclaimer, the term of this patent is extended or adjusted under 35 U.S.C. 154(b) by 813 days.

(21) Appl. No.: 11/747,856

(22) Filed: May 11, 2007

(65) Prior Publication Data

US 2008/0046479 A1 Feb. 21, 2008

Related U.S. Application Data

(60) Provisional application No. 60/800,015, filed on May 12, 2006.

(51) Int. Cl.
*G06F 7/00* (2006.01)
*G06F 17/30* (2006.01)

(52) U.S. Cl. .................. 707/672; 707/682; 711/161

(58) Field of Classification Search .................. 707/202, 707/204, E17.007, 674, 610, 640, 661, 662, 707/672, 673, 675, 676, 677, 678, 679, 680, 707/681, 682; 711/161, 162
See application file for complete search history.

(56) References Cited

U.S. PATENT DOCUMENTS

| | | | | |
|---|---|---|---|---|
| 5,043,866 A * | 8/1991 | Myre et al. | .................... | 707/202 |
| 5,278,982 A * | 1/1994 | Daniels et al. | ................ | 707/202 |
| 5,280,611 A * | 1/1994 | Mohan et al. | .................... | 707/8 |
| 5,455,946 A * | 10/1995 | Mohan et al. | ................. | 707/202 |
| 5,832,493 A * | 11/1998 | Marshall et al. | ....................... | 1/1 |
| 5,845,292 A * | 12/1998 | Bohannon et al. | ..................... | 1/1 |
| 5,862,318 A * | 1/1999 | Habben | ........................... | 714/20 |
| 5,933,838 A * | 8/1999 | Lomet | ........................... | 707/202 |
| 6,014,674 A * | 1/2000 | McCargar | ..................... | 707/202 |
| 6,101,504 A * | 8/2000 | Gord | .................................... | 1/1 |
| 6,122,675 A * | 9/2000 | Fisher et al. | ................. | 719/318 |
| 6,148,308 A * | 11/2000 | Neubauer et al. | ..................... | 1/1 |
| 6,161,109 A * | 12/2000 | Matamoros et al. | ......... | 707/203 |
| 6,185,663 B1 * | 2/2001 | Burke | ........................... | 711/156 |
| 6,199,070 B1 * | 3/2001 | Polo-Wood et al. | ................. | 1/1 |
| 6,490,594 B1 * | 12/2002 | Lomet | ........................... | 707/200 |
| 6,507,853 B2 * | 1/2003 | Bamford et al. | ....................... | 1/1 |
| 6,567,928 B1 * | 5/2003 | Lyle et al. | ....................... | 714/15 |

(Continued)

OTHER PUBLICATIONS

Mohan, C., et al., "ARIES: A Transaction Recovery Method Supporting Fine-Granularity Locking and Partial Rollbacks Using Write-Ahead Logging", ACM Transactions on Database Systems, vol. 17, No. 1, Mar. 1992, pp. 94-162.*

(Continued)

*Primary Examiner* — Jean B Fleurantin
(74) *Attorney, Agent, or Firm* — Kilpatrick Townsend & Stockton LLP

(57) ABSTRACT

A computer readable storage medium includes executable instructions to receive a specification for requested data in a log based replication system where data changes are retrieved from both a transaction log and a database. It is determined that the requested data is compromised. A search for a data image containing the requested data is initiated. The data image is accessed to secure the requested data. The requested data is returned.

17 Claims, 4 Drawing Sheets

U.S. PATENT DOCUMENTS

| | | | | |
|---|---|---|---|---|
| 6,598,078 | B1* | 7/2003 | Ehrlich et al. | 709/224 |
| 6,728,879 | B1* | 4/2004 | Atkinson | 713/168 |
| 6,845,384 | B2* | 1/2005 | Bamford et al. | 707/205 |
| 6,978,279 | B1* | 12/2005 | Lomet et al. | 707/202 |
| 7,039,773 | B2* | 5/2006 | Hu et al. | 711/158 |
| 7,065,537 | B2* | 6/2006 | Cha et al. | 707/202 |
| 7,412,460 | B2* | 8/2008 | Hrle et al. | 707/104.1 |
| 7,885,922 | B2* | 2/2011 | Pareek et al. | 707/610 |
| 2002/0116404 | A1* | 8/2002 | Cha et al. | 707/202 |
| 2003/0204516 | A1* | 10/2003 | Klosterhalfen et al. | 707/100 |
| 2003/0212789 | A1* | 11/2003 | Hamel et al. | 709/225 |
| 2004/0193945 | A1* | 9/2004 | Eguchi et al. | 714/6 |
| 2004/0260726 | A1* | 12/2004 | Hrle et al. | 707/104.1 |
| 2005/0246612 | A1* | 11/2005 | Leis et al. | 714/763 |
| 2006/0106860 | A1* | 5/2006 | Dee et al. | 707/102 |
| 2006/0150001 | A1* | 7/2006 | Eguchi et al. | 714/6 |
| 2006/0224636 | A1* | 10/2006 | Kathuria et al. | 707/200 |
| 2007/0005664 | A1* | 1/2007 | Kodavalla et al. | 707/202 |

OTHER PUBLICATIONS

Microsoft Computer Dictionary, 5th Edition, Microsoft Press, Redmond, WA, © 2002, p. 141.*

Moss, J. Eliot B., "Log-Based Recovery for Nested Transactions", Proc. of the 13th VLDB Conf., Brighton, UK, Sep. 1-4, 1987, pp. 427-432.*

Dai, Hui, et al., "ELF: An Efficient Log-Structured Flash File System for Micro Sensor Nodes", SenSys '04, Baltimore, MD, Nov. 3-5, 2004, pp. 176-187.*

Lomet, David, et al., "Redo Recovery After System Crashes", Proc. of the 21st VLDB Conf., Zurich, Switzerland, © 1995, pp. 457-468.*

Weikum, Gerhard, et al., "Multi-Level Recovery", Proc. of the 9th ACM SIGACT-SIGMOD-SIGART Symposium on Prin. of Database Systems, Nashville, TN, © 1990, pp. 109-123.*

Svobodova, Liba, "A Reliable Object-Oriented Data Repository for a Distributed Computer System", Proc. of the 8th ACM Symposium on Operating System Principles, Pacific Grove, CA, © 1981, pp. 47-58.*

Sadeg, Bruno, et al., "A Causal-Phase Protocol to Order Soft Real-Time Transactions in a Distributed Database", LCN 2001, Tampa, FL, Nov. 14-16, 2001, pp. 288-295.*

Seltzer, Transaction support in a log-structured file system, 1993, IEEE, 503-510.*

Pareek, Alok et al., *Read consistent data fetches using Flashback query, Version 2.0*, Dec. 25, 2009, 8 pages.

Garcia-Molina, H., et al., "Sagas", Proceedings of ACM SIGMOD International Conference on Management of Data, 1987, pp. 249-259.

Moss, J.E.B., "Nested Transactions: An Approach to Reliable Distributed Computing", MIT/LCS/TR-260 Laboratory for Computer Science, Massachusetts Institute of Technology, Cambridge, U.S.A., 1981, 183 pages.

Oracle 9 Concepts Manual, Release 1 (9.0.1), Part No. A88856-02, 71 pages, Sep. 8, 2008.

Oracle 9.2 DQL Reference Manual, Release 2 (9.2), Part No. A96540-02, 116 pages, Sep. 8, 2008.

* cited by examiner

APPARATUS AND METHOD FOR READ CONSISTENCY IN A LOG MINING SYSTEM

CROSS-REFERENCE TO RELATED APPLICATION

This application claims priority to U.S. Provisional Patent Application 60/800,015, entitled "Using Multi-Version Read Consistency in a Log Mining Scheme to Handle Encrypted, Compressed, Non-Logged or Partially Logged Data", filed May 12, 2006, the contents of which are incorporated by reference.

BRIEF DESCRIPTION OF THE INVENTION

This invention relates generally to the storage and retrieval of digital data. More particularly, this invention relates to techniques for establishing read consistency in log mining systems.

BACKGROUND OF THE INVENTION

Data logging is the practice of recording data to form log data. Typically, the log data is sequential and is recorded chronologically. In computerized data logging, a computer program automatically records selected events in order to provide an audit trail.

Log mining is the process of analyzing log data for knowledge discovery purposes or for maintaining redundant logical replicas of a database system.

Traditionally, log data was used for database recovery at a physical (block/byte) level. More recently, a variety of business solutions require that log data be translatable into logical (Insert/Update/Delete) SQL operations. Database vendors have gradually begun to add support to extract these changes at a logical level, but this support is not yet available for a limited set of data types. Furthermore, some operations (e.g., large rows) may not be fully logged or not logged at all for efficiency reasons. For example, not logging operations unnecessary for database recovery improves log writing performance, reduces the overhead on the database and thereby reduces commit time latencies. Examples of non-logged data may include bulk loads and updates on large objects. Log data may also contain changes that are fully logged but encrypted for security reasons.

In each of these cases the information in the transaction logs must be supplemented with data from the actual database tables (i.e., row data). That is, information must be fetched directly from data blocks. This may result in inconsistencies between the transaction log and the database, as the database may reflect changes that have not been entered in the transaction log. Thus, there is a problem in any platform where some changes are retrieved from the log and others are fetched from the database.

Therefore, it would be desirable to provide a log mining solution that accounts for missing, partial and/or encrypted log data. More particularly, it would be desirable to provide a log mining fetching solution that guarantees data consistency on transaction boundaries in systems that retrieve data from both a log and a database.

SUMMARY OF THE INVENTION

The invention includes a computer readable storage medium with executable instructions to receive a specification for requested data in a log based replication system where data changes are retrieved from both a transaction log and a database. It is determined that the requested data is compromised. A search for a data image containing the requested data is initiated. The data image is accessed to secure the requested data. The requested data is returned.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
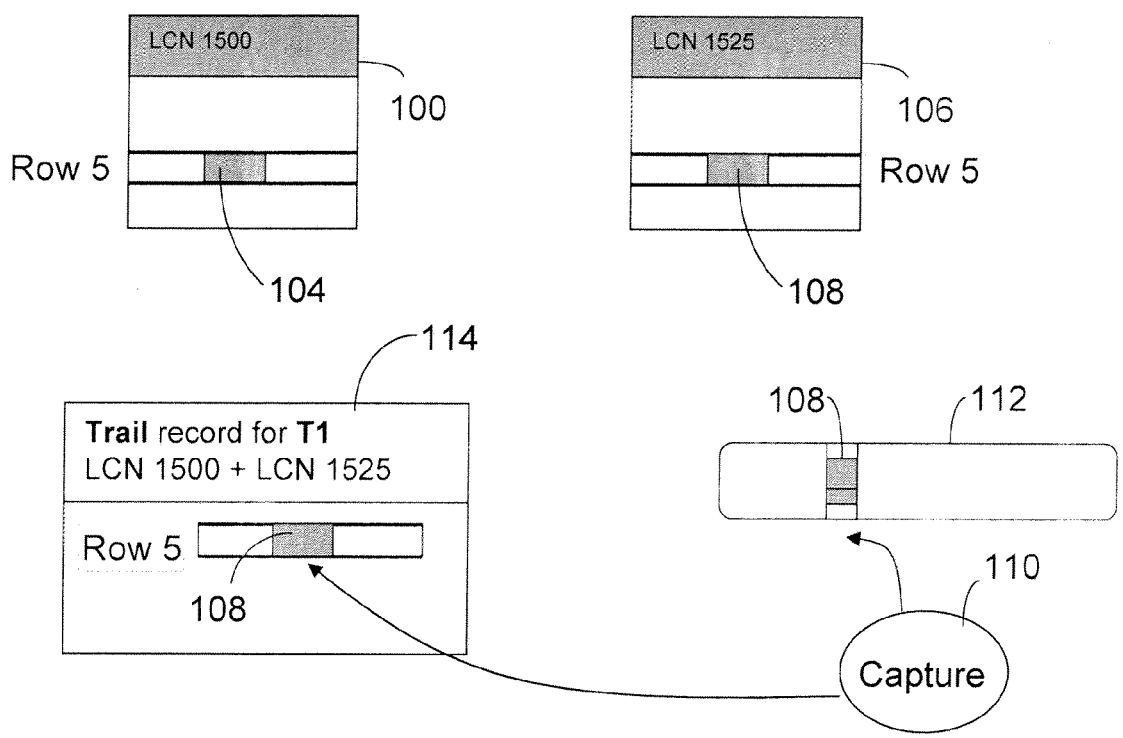
FIG. 1 illustrates a prior art problem that occurs in log based replication systems.

Most relational databases use logging techniques to store before and after images of changed data. These changes are placed in a transaction log that sits in non volatile (e.g., disk) storage. There are many useful reasons to maintain a transaction log, but the fundamental uses are to support transactional, crash, and data recovery. The database transaction log captures modifications made to the data pages (that belong to database tables) as transaction log records that represent atomic state transitions within the database. Each transaction log record is an atomic change that plays a critical part in satisfying the fundamental properties that guarantee persistence (durability) of committed transactions in the database. These fundamental properties are sometimes referred to as Atomicity, Consistency, Isolation, Durability or ACID.

The transaction log is usually implemented as a file, or series of files, and represents an archive of all the transactions that were submitted to the database. For some databases, once an online log file is full, logging moves to the next file in sequence. The previous log file usually gets archived for recovery purposes.

Each log file has a unique log sequence number (LSN). For other databases, the transaction log is circular and pages are archived and reused as those pages are required for additional logging.

One transaction can generate multiple change data records. Each change data record is generated with a unique change or ordering or sequence number that helps maintain ordering between changes made by multiple transactions.

Important properties of change data records include the unique row identifier (row ID) associated with the change data record, the primary or unique key associated with the change data record, and the Logical Change Number (LCN) of the transaction control record that committed the transaction in the database (Commit LCN).

Transactional data management platforms allow transactions (and thereby data) to be replicated across heterogeneous, as well as homogeneous systems. One technique to replicate data across different database systems, as well as different machine architectures, is called Log Based Replication (LBR). The replication is done asynchronously by reading a source database's transaction logs, and propagating the captured transactions to a target database. The flow of LBR is as follows:
1. An application starts a new transaction.
2. The transaction generates change data and transaction control records.
3. The database log manager writes the change data and transaction control records to the transaction log.
4. A capture process reads the transaction log and extracts the transaction's operations.
5. The capture process maintains a queue of all transactions' operations
6. Once the transaction commits, the changes are transmitted over the network to another database system.
7. An apply process at the second system replays the changes at that database.

Transactional log based replication is therefore a data replication method accomplished by translating the change data and transaction control records from the transaction log into transactions that subsequently get executed at the target database.

An LBR capture process, also referred to herein as capture, is the machine process that reads the source database's transaction/redo logs and captures the transactional changes. This process also fetches column data and combines the fetched data with the column data extracted from the transaction log, resulting in a composite record for the row. An LBR apply process, also referred to herein as apply, is the machine process that applies the changes at the target database that were captured by the LBR capture process.

Database vendors must provide read-consistency such that a user can read transactional data while it is being modified. If a user executes a query at a given time, then the query should return data consistent with that time, even if other users update the same data while the query is in process. Some vendors solve this problem using rollback segments and versioned data blocks. Other vendors solve the problem using locking and isolation levels.

Fetching data is the act of retrieving data from a database as specified by a query. Typically, fetched data reflects the current state of a record within the database as defined by the vendor's read-consistency model, as well as user-defined isolation level.

FIG. 1 illustrates a typical prior art scenario where the current record version is fetched from a data block or page given a row ID or primary or unique key. This method is problematic when fetching data that must be merged with a change data record from the transaction log, which is a logically different version than the record being fetched.

Transaction T1 at block 100 updates value 104 at row 5 and commits at LCN 1500. Transaction T5 of block 106 updates the same data with value 108 and commits at LCN 1525. The capture module 110 processes the change data record for row 5 for transaction T1 in transaction log 112. A fetch is issued for the partially logged column 104. The capture module 110 fetches the partially-logged data from the most current version of the data block/page (i.e., value 108 of block 106) and merges the fetched column data with the column data read directly from the transaction log. Since the fetched data reflects the change data record as of transaction T5, and the transaction log data being processed reflects the change data records as of transaction T1, it is possible that the column data within the composite record is inconsistent.

The example below, with data values, further clarifies this scenario.

Given table "INCONSISTENT" with 2 columns, "ID" and "PICTURE":

```
CREATE TABLE INCONSISTENT
{
    ID           NUMBER   NOT NULL
    PICTURE      CLOB,
    PRIMARY KEY (ID)
}
T1 (LCN 1500):
BEGIN;
INSERT INTO INCONSISTENT ("ID", "PICTURE") VALUES (1, "ORIGINAL PICTURE");
COMMIT;
T5 (LCN 1525):
BEGIN;
    INSERT INTO INCONSISTENT ("ID", "PICTURE") VALUES (1, "NEW PICTURE");
COMMIT;
```

By the time the capture process reads transaction T1, T5 has already been committed to the database. Given that the CLOB column "PICTURE" is partially-logged, and must be fetched, then the fetched value will be "NEW PICTURE". The resulting composite record generated by the capture process for transaction T1 would be:

ID=1

PICTURE="NEW PICTURE"

This is not a correct representation of transaction T1 since the data reflects LCN 1525 of T5, not LCN 1500. Thus, there is a data inconsistency across a transaction boundary.

When all column data for a change data record is not available within the transaction log, fetching data as of a particular version or LCN can provide transaction-level read consistency. The transaction-level read consistency is provided by a data image. The data image may be implemented as a snapshot mechanism available in some databases or as a temporal log. Multi-version read consistent fetching allows for fetching of column data as of a given time or LCN and is consistent at transaction boundaries.

Fetched column data is merged with the change data record read from the transaction log to create a composite record. In the case of non-logged, partially-logged encrypted, or compressed column data, the fetched result ma replace the column data read from the transaction log.

Figure 2:
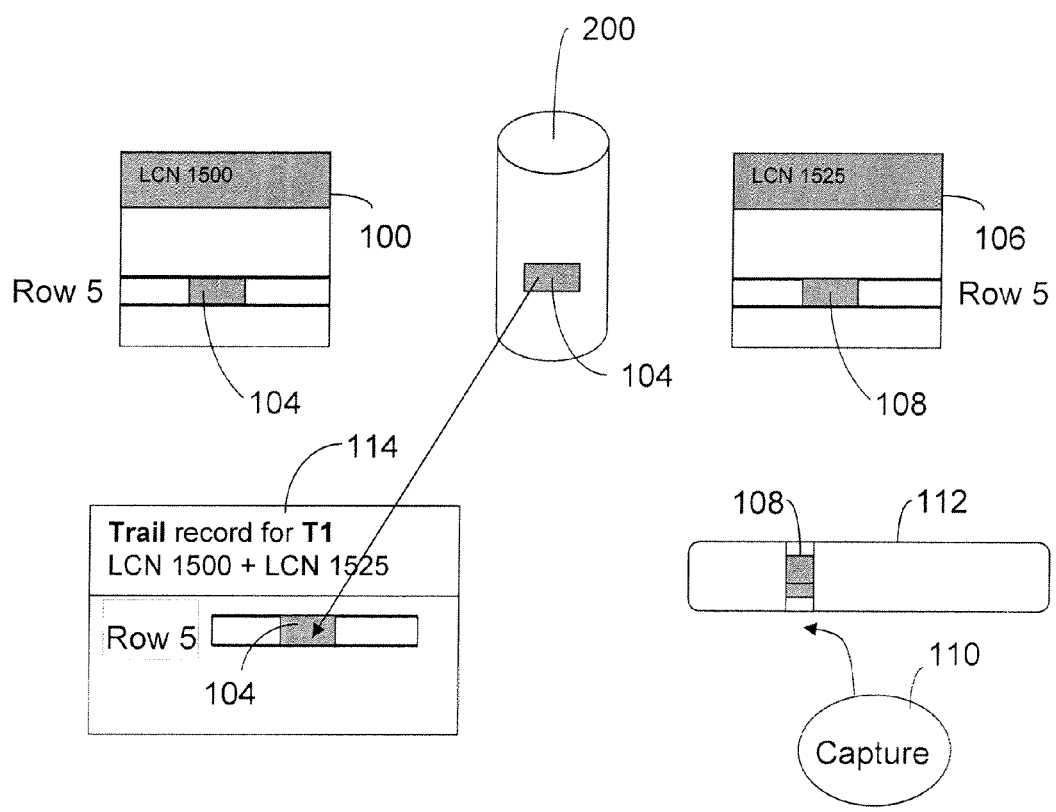
FIG. 2 illustrates a log based replication system configured in accordance with an embodiment of the invention.

FIG. 2 shows the process used to generate a consistent composite change data record. Transaction T1 updates row 5 value 104 and commits at LCN 1500. Transaction T5 updates the same data within row 5 with value 108 and commits at LCN 1525. The capture module 100 processes the change data record for row 5 for transaction T1 and a fetch is issued as of LCN 1500 for the partially logged column. In particular, the fetch is to a data image 200, which contains the value 104. The capture module fetches the partially-logged data from the data image as of LCN 1500 and merges the fetched column data with the column data read directly from the transaction log 112.

Since the fetched data reflects the change data record as of transaction T1 and LCN 1500 (not T5 at LCN 1525), the composite record is a transaction-level, read-consistent view of the change data record.

The original example can now be used to confirm the expected results.

Given table "INCONSISTENT" with 2 columns, "ID" and "PICTURE":

```
CREATE TABLE INCONSISTENT
{
    ID          NUMBER  NOT NULL
    PICTURE     CLOB,
    PRIMARY KEY (ID)
}
T1 (LCN 1500):
BEGIN;
INSERT INTO INCONSISTENT ("ID", "PICTURE") VALUES (1,
"ORIGINAL PICTURE");
COMMIT;
T5 (LCN 1525):
BEGIN;
    INSERT INTO INCONSISTENT ("ID", "PICTURE") VALUES (1,
"NEW PICTURE");
COMMIT;
```

By the time the capture process reads transaction T1, T5 has already been committed to the database. Given that the CLOB column "PICTURE" is partially-logged, and must be fetched, then the fetched value will be "ORIGINAL PICTURE" because the capture process is fetching from the snapshot as of LCN 1500. The resulting composite record generated by the capture process for transaction T1 would be:
ID=1
PICTURE="ORIGINAL PICTURE"
Even though fetching was required, the composite record is now a consistent view of T1 since the fetched data reflects the contents as of LCN 1500.

In order to retrieve a read-consistent view of data for a given change data record, a query is issued with a specific LCN and a unique row identifier (row ID). It is possible that a row ID is recycled (reused for a different key) within the same transaction. If this occurs then the data fetched for a particular row ID may not be consistent with the change data from the transaction log.

This inconsistency can be detected by also fetching the key column data for the given LCN. The fetched key column data can then be compared to the key column data in the change data record read from the transaction log. If the key column data has changed then a new fetch must be performed for the same LCN using the key column data from the transaction log.

There are many reasons that fetching a change data record as of a given LCN may not be possible. Some of these reasons include: a lack of undo/rollback retention for generating versioned changed data records as of a given LCN, dynamic data link (DDL) changes to database objects may invalidate undo/rollback and the ability to fetch versioned changed data records; a snapshot may no longer be available and the change data record was deleted, or a table was truncated, within the current version.

If a record cannot be retrieved from the data image, but the current version is available, then the composite record is potentially inconsistent and is marked as such when propagated. If a record cannot be retrieved from the data image, or fetched directly from the database, then the composite record will only contain change data available in the transaction log and is inconsistent. The composite record is marked as inconsistent when propagated.

Figure 3:
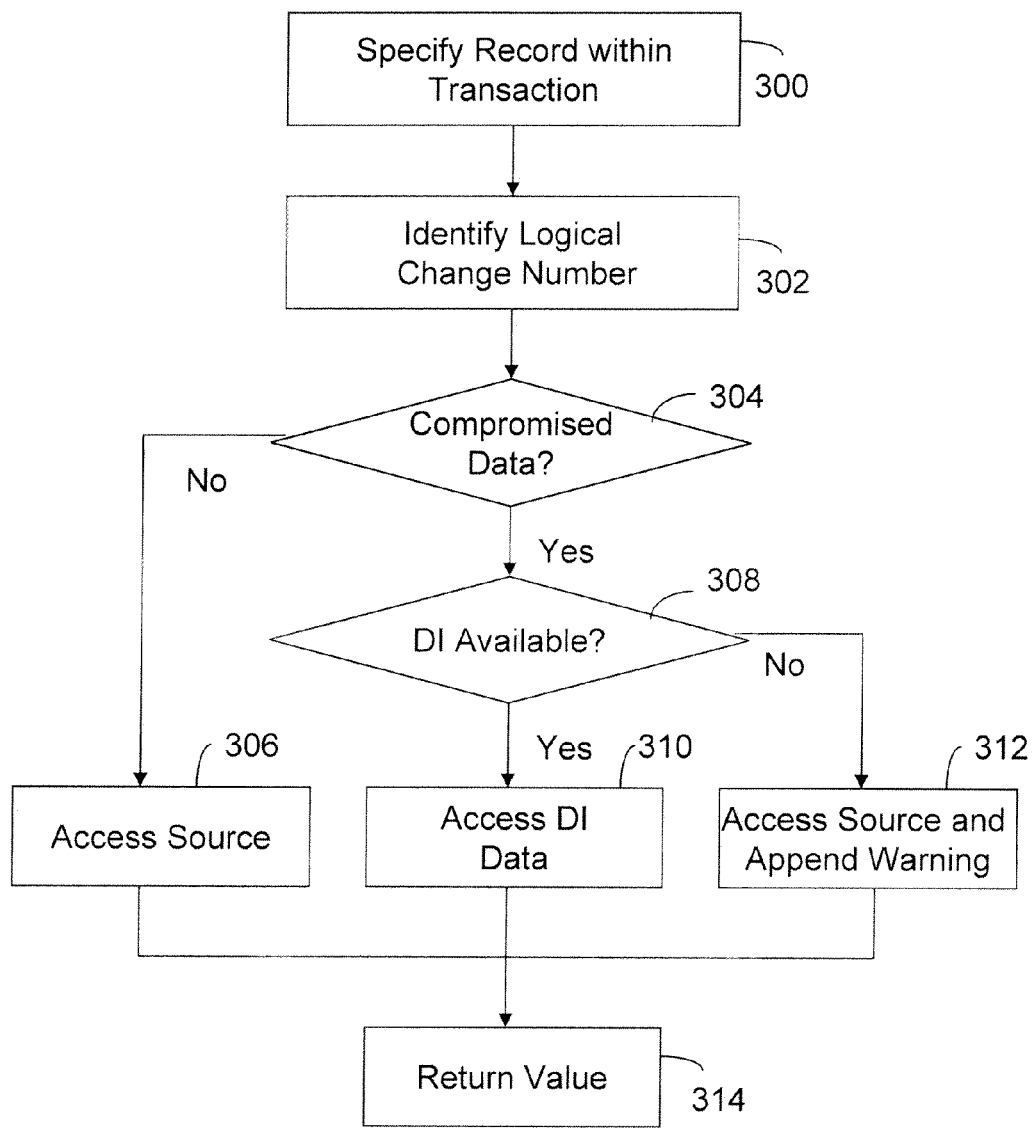
FIG. 3 illustrates processing operations associated with an embodiment of the invention.

The processing of the invention is more fully appreciated with reference to FIG. 3. A record is specified within a transaction 300. For example, the row and key column data may be specified. The logical change number is then identified 302. The data specified by the record and the logical change number is then accessed to determine if the data is compromised 304. For example, the data may be compromised if it is not logged, it is partially logged, it is encrypted and/or compressed. If the data is not compromised (304-NO), then the source is accessed 306 and the value is returned 314. If the data is compromised (304-YES), it is determined whether a data image (DI) is available 308. If so (308-YES), the data is accessed in the data image 310 and the value is returned 314. If a DI is not available (308-NO), the source is accessed and a warning is appended to the data 312, the composite information is then returned 314.

Figure 4:
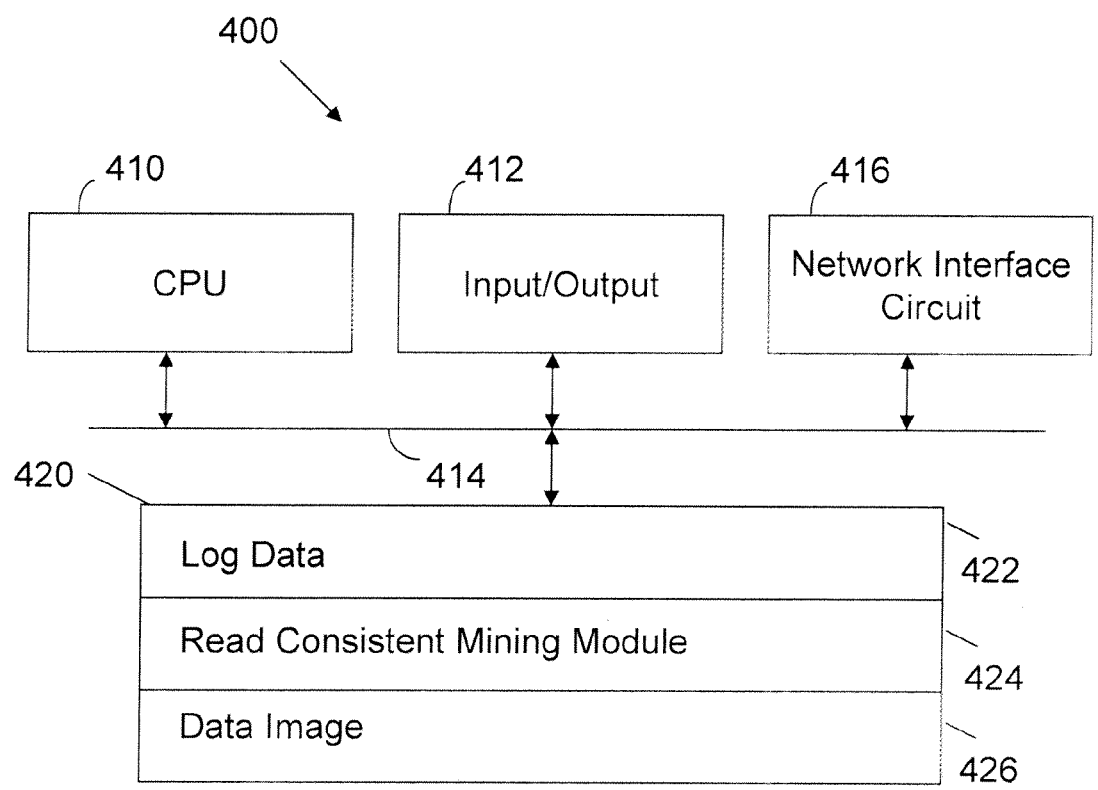
FIG. 4 illustrates a computer configured in accordance with an embodiment of the invention.

The operations of the invention may be implemented in a general purpose computer. FIG. 4 illustrates a computer 400 with standard components, such as a central processing unit 410, which communicates with input/output devices 412 via a bus 414. The input/output devices 412 may include a keyboard, mouse, monitor, printer, and the like. Also connected to the bus 414 is a network interface circuit 416, which provides connectivity to a network (not shown). Thus, the invention may be implemented in a client-server or other networked environment.

A memory 420 is also connected to the bus 414. The memory 420 stores log data 422. The memory also stores a read consistent mining module 424, which includes executable instructions to implement operations of the invention, such as shown in FIG. 3. The read consistent mining module 424 selectively accesses a data image 426, as discussed above.

Advantageously, the technique of the invention can be used for all databases and database configurations where an LCN is available. In multi-node environments, the LCN must be unique across all participating nodes. For example, this method is viable in a shared-nothing environment, such as an IBM DB2 data sharing environment, as well as in an Oracle RAC configuration.

Those skilled in the art will recognize a number of advantages associated with the invention. For example, the invention provides a read-consistent view of transaction log data and fetched data that is not logged, partially logged, encrypted and/or compressed. The invention may be implemented with a variety of data images, such as a vendor-provided "snapshot" or an externally generated temporal log. Fetching by row identifier is used for efficiency, while handling scenarios where row identifiers are reused.

The invention may be implemented to fetch a read consistent version of non-logged data, partially logged data, encrypted data, or compressed data. The fetched data may be used to replicate the data into another database, memory, file or warehouse. The invention is operative to fetch a read-consistent version of a change data record when transaction logs are unavailable and a database trigger is used to record a unique row identifier, the key column data and the commit LCN.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices, magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
    receive a specification for requested data in a log based replication system where data changes are retrieved from both a transaction log and a database;
    receive a specification that characterizes a logical change number associated with the requested data;
    determine that the requested data is compromised in the transaction log, wherein the requested data is compromised if the requested data is at least two of: not logged in the transaction log, partially logged in the transaction log, encrypted, or compressed;
    search for a data image outside the transaction log containing the requested data as of a specified log change number;
    access the data image to secure the requested data;
    return the requested data; and
    generate at least one composite record, based at least in part on the returned data.

2. The computer readable storage medium of claim 1 further comprising executable instructions to receive a specification that characterizes a record.

3. The computer readable storage medium of claim 1 further comprising executable instructions to receive a specification that characterizes a column.

4. The computer readable storage medium of claim 1 wherein the specification forms part of a query.

5. The computer readable storage medium of claim 1 wherein the executable instructions to determine include executable instructions to determine that the data is not logged.

6. The computer readable storage medium of claim 1 wherein the executable instructions to determine include executable instructions to determine that the data is partially logged.

7. The computer readable storage medium of claim 1 wherein the executable instructions to determine include executable instructions to determine that the data is encrypted.

8. The computer readable storage medium of claim 1 wherein the executable instructions to determine include executable instructions to determine that the data is compressed.

9. The computer readable storage medium of claim 1 wherein the executable instructions to search for a data image include executable instructions to search for a data snapshot.

10. The computer readable storage medium of claim 1 wherein the executable instructions to search for a data image include executable instructions to search for a temporal log.

11. The computer readable storage medium of claim 1 further comprising executable instructions to append a warning to data retrieved from the database when a data image is not available.

12. The computer readable storage medium of claim 1 further comprising executable instructions to replicate the requested data in a database.

13. The computer readable storage medium of claim 1 further comprising executable instructions to replicate the requested data in a memory.

14. The computer readable storage medium of claim 1 further comprising executable instructions to replicate the requested data in a file.

15. The computer readable storage medium of claim 1 further comprising executable instructions to replicate the requested data in a warehouse.

16. A method, comprising:
    receiving, at a computer system, a specification for requested data in a log based replication system where data changes are retrieved from both a transaction log and a database;
    receiving, at the computer system, a specification that characterizes a logical change number associated with the requested data;
    determining, at the computer system, that the requested data is compromised in the transaction log, wherein the requested data is compromised if the requested data is at least two of: not logged in the transaction log, partially logged in the transaction log, encrypted, or compressed;
    searching for a data image outside the transaction log containing the requested data current as of a specified log change number;
    accessing the data image with the computer system to secure the requested data;
    returning the requested data; and
    generating at least one composite record based at least in part on the returned data.

17. A computer system, comprising:
    a central processing unit; and
    a computer readable storage medium, comprising instructions executable by the central processing unit to cause the computer system to:
        receive a specification for requested data in a log based replication system where data changes are retrieved from both a transaction log and a database;
        receive a specification that characterizes a logical change number associated with the requested data;
        determine that the requested data is compromised in the transaction log, wherein the requested data is compromised if the requested data is at least two of: not logged in the transaction log, partially logged in the transaction log, encrypted, or compressed;
        search for a data image outside the transaction log containing the requested data current as of a specified log change number;
        access the data image to secure the requested data;
        return the requested data; and
        generate at least one composite record, based at least in part on the returned data.

* * * * *

UNITED STATES PATENT AND TRADEMARK OFFICE
CERTIFICATE OF CORRECTION

| | | |
|---|---|---|
| PATENT NO. | : 8,296,269 B2 | Page 1 of 1 |
| APPLICATION NO. | : 11/747856 | |
| DATED | : October 23, 2012 | |
| INVENTOR(S) | : Pareek et al. | |

It is certified that error appears in the above-identified patent and that said Letters Patent is hereby corrected as shown below:

On page 2, in column 2, under "Other Publications", line 25, delete "DQL" and insert -- SQL --, therefor.

In column 4, line 46, delete "ma" and insert -- may --, therefor.

In column 6, line 60, delete "devices," and insert -- devices; --, therefor.

Signed and Sealed this
Eighth Day of January, 2013

David J. Kappos
*Director of the United States Patent and Trademark Office*